(12) United States Patent
Zhu et al.

(10) Patent No.: US 9,829,887 B2
(45) Date of Patent: Nov. 28, 2017

(54) INFORMATION PROCESSING METHOD AND ELECTRONIC DEVICE

(71) Applicants: Beijing Lenovo Software Ltd., Beijing (CN); Lenovo (Beijing) Co., Ltd., Beijing (CN)

(72) Inventors: Xiaotian Zhu, Beijing (CN); Yan Gao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 15 days.

(21) Appl. No.: 14/757,406

(22) Filed: Dec. 23, 2015

(65) Prior Publication Data

US 2016/0375586 A1    Dec. 29, 2016

(30) Foreign Application Priority Data

Jun. 26, 2015    (CN) .......................... 2015 1 0364565

(51) Int. Cl.
 G05D 1/00    (2006.01)
 G05D 1/02    (2006.01)
 B25J 11/00    (2006.01)
(52) U.S. Cl.
 CPC .............. G05D 1/02 (2013.01); B25J 11/008 (2013.01); *Y10S 901/01* (2013.01)
(58) Field of Classification Search
 CPC combination set(s) only.
 See application file for complete search history.

(56) References Cited

U.S. PATENT DOCUMENTS

| 5,198,800 | A  | * | 3/1993 | Tozawa | E02F 9/2033 |
| | | | | | 212/276 |
| 5,939,986 | A  | * | 8/1999 | Schiffbauer | B66C 15/045 |
| | | | | | 299/12 |
| 6,614,721 | B2 | * | 9/2003 | Bokhour | G01S 11/16 |
| | | | | | 340/686.6 |
| 6,963,278 | B2 | * | 11/2005 | Frame | B66C 15/045 |
| | | | | | 340/539.22 |
| 7,519,457 | B2 | * | 4/2009 | Hasegawa | G05D 1/0212 |
| | | | | | 180/167 |
| 7,584,048 | B2 | * | 9/2009 | Pham | G01C 21/20 |
| | | | | | 701/434 |
| 7,728,729 | B2 | * | 6/2010 | Christopher | G06Q 10/08 |
| | | | | | 235/385 |
| 7,890,235 | B2 | * | 2/2011 | Self | G01S 3/143 |
| | | | | | 340/539.1 |
| 8,195,344 | B2 | * | 6/2012 | Song | G08C 17/00 |
| | | | | | 701/2 |

(Continued)

*Primary Examiner* — Jonathan L Sample
(74) *Attorney, Agent, or Firm* — Harness, Dickey & Pierce, P.L.C.

(57) ABSTRACT

An information processing method and an electronic device are provided. The method includes: acquiring a first parameter related to a first behavior of a user of an electronic device, in a case that a current position of the electronic device is a first position, where the first behavior is a behavior which does not cause the electronic device to move; determining whether the first parameter meets a preset condition to obtain a first determination result; and adjusting the current position from the first position to a second position, in a case that it is determined that the first parameter meets the preset condition.

16 Claims, 5 Drawing Sheets

(56) References Cited

U.S. PATENT DOCUMENTS

| | | | |
|---|---|---|---|
| 8,272,467 B1* | 9/2012 | Staab | E02F 9/26 172/2 |
| 8,970,363 B2* | 3/2015 | Kraimer | B60R 21/0132 172/2 |
| 9,037,283 B2* | 5/2015 | Ellison-Marion | G06F 21/71 700/177 |
| 9,122,276 B2* | 9/2015 | Kraimer | G05D 1/0016 |
| 9,126,334 B2* | 9/2015 | Nakamura | B25J 9/1676 |
| 9,635,156 B2* | 4/2017 | Alameh | H04M 1/725 |
| 2004/0190754 A1* | 9/2004 | Sakagami | H04N 7/18 382/103 |
| 2005/0104736 A1* | 5/2005 | Gudat | B66C 15/045 340/686.6 |
| 2005/0107934 A1* | 5/2005 | Gudat | G01S 5/0072 701/50 |
| 2006/0142916 A1* | 6/2006 | Onuma | B60G 17/015 701/38 |
| 2006/0184273 A1* | 8/2006 | Sawada | B25J 13/00 700/245 |
| 2009/0265670 A1* | 10/2009 | Kim | G06F 3/04883 715/863 |
| 2010/0222925 A1* | 9/2010 | Anezaki | G05D 1/0221 700/253 |
| 2012/0035797 A1* | 2/2012 | Oobayashi | G05D 1/0214 701/23 |
| 2012/0085458 A1* | 4/2012 | Wenzel | A01F 25/14 141/10 |
| 2015/0032260 A1* | 1/2015 | Yoon | A47L 9/2857 700/257 |
| 2015/0088310 A1* | 3/2015 | Pinter | G06Q 50/22 700/253 |
| 2016/0063944 A1* | 3/2016 | Su | G09G 5/00 345/211 |
| 2016/0274580 A1* | 9/2016 | Jung | G05D 1/0022 |
| 2016/0344856 A1* | 11/2016 | Alameh | H04M 1/725 |
| 2016/0375586 A1* | 12/2016 | Zhu | G05D 1/02 700/258 |

* cited by examiner

INFORMATION PROCESSING METHOD AND ELECTRONIC DEVICE

CROSS REFERENCE TO RELATED APPLICATIONS

The present application claims the priority to Chinese Patent Application No. 201510364565.2, titled "INFORMATION PROCESSING METHOD AND ELECTRONIC DEVICE", filed on Jun. 26, 2015 with the State Intellectual Property Office of People's Republic of China, the content of which is incorporated herein by reference.

FIELD

The present disclosure relates to the field of electronics technology, and in particular to an information processing method and an electronic device.

BACKGROUND

With the continuous development of science and technology, an electronic device is developed quickly. In order to make people's life become more convenient, more and more interactive robots are used in people's daily life, for example, the robot is used to explore and detect in a special environment or do housework.

In the conventional technology, when the user wants to make the robot provide service, the user performs remote control on the robot using a remote controller at a far position or sets the robot's path to make the robot move close to the user, and then the user operates the robot or transmits an instruction to the robot.

SUMMARY

An information processing method and an electronic device are provided according to embodiments of the present disclosure, so as to solve a technical issue that the conventional electronic device can not adjust a current position until a control instruction from a user or a remote controller is received, and achieve a technical effect that the electronic device adjusts its current position based on a behavior of the user.

In an aspect, an information processing method is provided according to an embodiment of the present disclosure, which includes:

acquiring a first parameter related to a first behavior of a user of an electronic device, in a case that a current position of the electronic device is a first position, where the first behavior is a behavior which does not cause the electronic device to move;

determining whether the first parameter meets a preset condition to obtain a determination result; and adjusting the current position from the first position to a second position, in a case that it is determined that the first parameter meets the preset condition.

Optionally, the acquiring a first parameter related to a first behavior of a user of an electronic device may include:

acquiring, based on first user information on the user, a first distance between the user and the electronic device; or acquiring, based on the first user information and a fourth position where a first reference object is located, a second distance between the user and the first reference object, where the first reference object is an object preset by the user.

Optionally, the first user information on the user may include a third position where the user is located or first locating information obtained by locating the electronic device and a wearable electronic device worn on a body of the user.

Optionally, in a case that the first parameter is the first distance, the determining whether the first parameter meets a preset condition to obtain a first determination result may include:

determining whether the first distance is not within a first preset distance range to obtain a first determination result.

Optionally, in a case that the first parameter is the second distance, the determining whether the first parameter meets a preset condition to obtain a first determination result may include:

determining whether the second distance is less than or equal to a first preset distance to obtain a first determination result.

Optionally, the adjusting the current position from the first position to a second position may include:

determining, based on the first distance, a moving direction and a moving distance of the electronic device, in a case that it is determined that the first distance is not within the first preset distance range; and controlling the electronic device to move for the moving distance in the moving direction, from the first position to the second position, where the second position is a position where a third distance between the electronic device and the user is within the first preset distance range.

Optionally, the adjusting the current position from the first position to a second position may include:

determining that a first direction parameter is a first direction, in a case that it determined that the first distance is not within the first preset distance range;

determining, based on the first distance, a moving direction and a moving distance of the electronic device; and controlling the electronic device to move for the moving distance in the moving direction, from the first position to the second position, where a current relative position relation between the electronic device and the user is the same as a first relative position relation between the electronic device and the user when the electronic device is located at the first position, and the second position is a position which is located on a first ray starting from the third position and extending in a second direction opposite to the first direction, where a fourth distance between the electronic device and the user is within a preset comfortable distance range.

Optionally, the adjusting the current position from the first position to a second position may include:

determining, based on the second distance, a moving direction and a moving distance of the electronic device, in a case that it is determined that the second distance is less than or equal to the first preset distance; and controlling the electronic device to move for the moving distance in the moving direction, from the first position to the second position, where the second position is a position which is located between the third position and the fourth position and located on a first line segment between the user and the first reference object.

In a second aspect, an electronic device is provided according to an embodiment of the present disclosure, which includes:

a first acquiring unit configured to acquire a first parameter related to a first behavior of a user of the electronic device in a case that a current position of the electronic device is a first position, where the first behavior is a behavior which does not cause the electronic device to move;

a first determining unit configured to determine whether the first parameter meets a preset condition to obtain a determination result; and a first adjusting unit configured to adjust the current position from the first position to a second position in a case that it is determined that the first parameter meets the preset condition.

According to an embodiment of the present disclosure, an electronic device is further provided, which includes:

a housing;

a sensor arranged within the housing and configured to acquire a first parameter related to a first behavior of a user of the electronic device in a case that a current position of the electronic device is a first position, where the first behavior is a behavior which does not cause the electronic device to move;

a processor arranged within the housing, connected to the sensor and configured to determine whether the first parameter meets a preset condition to obtain a first determination result; and a driving unit arranged within the housing and connected to the processor, where the processor is configured to control the driving unit to drive the electronic device to move from the first position to a second position, in a case that it is determined that the first parameter meets the preset condition.

Optionally, the sensor may be configured to:

acquire, based on first user information on the user, a first distance between the user and the electronic device; or acquire, based on the first user information and a fourth position where a first reference object is located, a second distance between the user and the first reference object, where the first reference object is an object preset by the user.

Optionally, the sensor may include:

a communication component connected to the processor and configured to locate and communicate with a wearable electronic device worn on a body of the user to obtain first location information.

Optionally, in a case that the first parameter is the first distance, the processor may be configured to:

determine whether the first distance is not within a first preset distance range to obtain a first determination result.

Optionally, in a case that the first parameter is the second distance, the process may be configured to:

determine whether the second distance is less than or equal to a first preset distance to obtain a first determination result.

Optionally, the processor may be configured to:

determine, based on the first distance, a moving direction and a moving distance of the electronic device, in a case that it is determined that the first distance is not within the first preset distance range; and control the driving unit to drive the electronic device to move for the moving distance in the moving direction, from the first position to the second position, where the second position is a position where a third distance between the electronic device and the user is within the first preset distance range.

Optionally, the processor may be configured to:

determine that a first direction parameter is a first direction, in a case that it is determined that the first distance is not within the first preset distance range;

determine, based on the first distance, a moving direction and a moving distance of the electronic device; and control the driving unit to drive the electronic device to move for the moving distance in the moving direction, from the first position to the second position, where a current relative position relation between the electronic device and the user is the same as a first relative position relation between the electronic device and the user when the electronic device is located at the first position, and the second position is a position which is located on a first ray starting from the third position and extending in a second direction opposite to the first direction, where a fourth distance between the electronic device and the user is within a preset comfortable distance range.

Optionally, the processor may be configured to:

determine, based on the second distance, a moving direction and a moving distance of the electronic device, in a case that it is determined that the second distance is less than or equal to the first preset distance; and control the driving unit to drive the electronic device to move for the moving distance in the moving direction, from the first position to the second position, where the second position is a position which is located between the third position and the fourth position and located on a first line segment between the user and the first reference object.

BRIEF DESCRIPTION OF THE DRAWINGS

In order to illustrate technical solutions in embodiments of the present disclosure or the conventional technology more clearly, drawings to be used for the description of the embodiments are introduced simply hereinafter. Apparently, the drawings described below only describe some of the embodiments of the present disclosure.

DETAILED DESCRIPTION OF THE EMBODIMENTS

An information processing method and an electronic device are provided according to embodiments of the present disclosure. The information processing method according to the embodiments of the present disclosure includes:

acquiring a first parameter related to a first behavior of a user of an electronic device in a case that a current position of the electronic device is a first position, where the first behavior is a behavior which does not cause the electronic device to move;

determining whether the first parameter meets a preset condition to obtain a first determination result; and adjusting the current position from the first position to a second position in a case that it is determined that the first parameter meets the preset condition.

In the above technical solutions, a first parameter related to a first behavior of a user of an electronic device is acquired in a case that a current position of the electronic device is a first position, where the first behavior is a behavior which does not cause the electronic device to move; it is determined whether the first parameter meets a preset condition to obtain a first determination result; and the current position is adjusted from the first position to a second position in a case that it is determined that the first parameter meets the preset condition. In this way, the electronic device can detect a parameter related to the user automatically and make a determination based on the parameter; in a case that the parameter meets a movement condition of the electronic device, the electronic device can adjust its current position automatically based on the current parameter, thereby efficiently solving the technical issue that the conventional electronic device can not adjust the current position until a control instruction from the user or a remote controller is received, and achieving a technical effect that the electronic device adjusts its current position based on a behavior of the user.

In order to make objects, technical solutions and advantages of embodiments of the present disclosure more clearly, the technical solutions of the present disclosure are described clearly and completely in conjunction with drawings of the embodiments of the present disclosure hereinafter. Apparently, the described embodiments are only a few rather than all of the embodiments for the technical solutions of the present disclosure. Any other embodiments obtained by those skilled in the art based on the embodiments in the specification of the present disclosure without any creative work fall within the scope of protection of the technical solutions of the present disclosure.

First Embodiment

Figure 1:
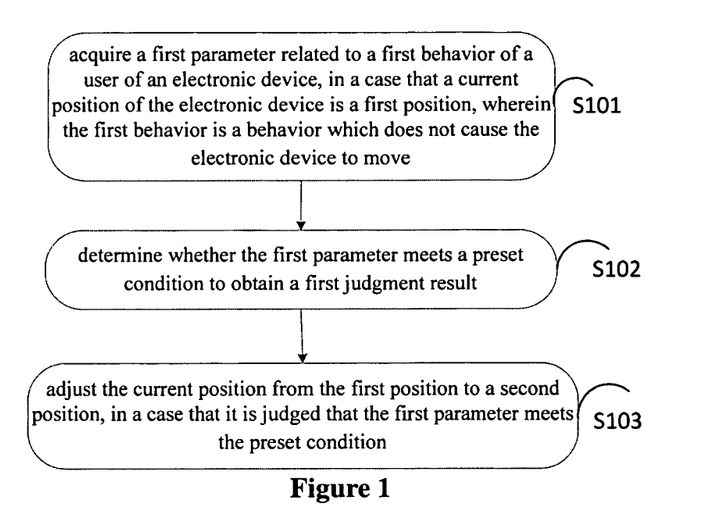
FIG. 1 is a flowchart of an information processing method according to a first embodiment of the present disclosure.

Referring to FIG. 1, an information processing method is provided according to the first embodiment of the present disclosure, which includes step S101 to step S103.

In step S101, a first parameter related to a first behavior of a user of an electronic device is acquired in a case that a current position of the electronic device is a first position, where the first behavior is a behavior which does not cause the electronic device to move.

In step S102, it is determined whether the first parameter meets a preset condition to obtain a first determination result.

In step S103, the current position is adjusted from the first position to a second position in a case that it is determined that the first parameter meets the preset condition.

During a specific implementing process, the electronic device may be an intelligent robot or other electronic devices which can receive and execute a control instruction to move, which are not listed here. In the embodiment of the present disclosure, the specific implementing process of the method according to the embodiment of the present disclosure is described in detail, assumed that the electronic device is the intelligent robot as an example.

In a case of processing information with the method according to the embodiment of the present disclosure, firstly, step S101 is performed, that is, a first parameter related to a first behavior of a user of an electronic device is acquired in a case that a current position of the electronic device is a first position, where the first behavior is a behavior which does not cause the electronic device to move.

During a specific implementing process, it is assumed that the electronic device is an intelligent robot as an example, a predetermined user may be set for the intelligent robot in a case of using the intelligent robot; the intelligent robot detects a parameter related to a user in a real-time manner and responds to a behavior of the predetermined user based on the detected parameter. The behavior of the user may be a behavior which does not cause the electronic device to move, for example, the user walks toward a refrigerator and takes a beverage out of the refrigerator. Alternatively, the behavior of the user may be a behavior which does not include content directly causing the electronic device to move to a second position, and the behavior including the content directly causing the electronic device to move to the second position may be a behavior in which the electronic device is controlled to move in response to a voice command, for example, by transmitting a voice command "walking forward 2 meters", by inputting a moving path of the electronic device on an input unit of the electronic device, or by making a specific spatial gesture, for example, the user making a gesture from left to right in the air, which are not listed here. In the embodiment of the present disclosure, any behavior which does not include the content directly controlling the electronic device to move is the behavior of the user according to the embodiment of the present disclosure; or the behavior of the user is a behavior made by the user to complete a first event, for example, the user walking from a bedroom to a kitchen to acquire food, where the first event is not related to an event of controlling the electronic device.

In the embodiment of the present disclosure, step S101 includes:

acquiring, based on first user information on the user, a first distance between the user and the electronic device; or acquiring, based on the first user information and a fourth position where a first reference object is located, a second distance between the user and the first reference object, where the first reference object is an object preset by the user.

The first user information on the user includes a third position where the user is located or first location information obtained by locating the electronic device and a wearable electronic device worn a body of the user.

During a specific implementing process, the above example is taken again, in a case that the user makes a behavior, the intelligent robot detects current information of the user automatically. For example, when the user walks from the bedroom to the kitchen, the intelligent robot may detect a current position of the user by means of infrared distance measurement to obtain the current position of the user, and then determines a first distance between the user and the intelligent robot at the current instant based on a position where the intelligent robot itself is located, for example, 4 m; the intelligent robot may also directly acquire a relative distance between the user and the intelligent robot in a way of 3D scanning and range detecting; the intelligent robot may also acquire the relative distance between the user and the intelligent robot by locating the electronic device, for example, by detecting signal strength of a bracelet worn on a wrist of the user and then determining the relative distance between the user and the intelligent robot based on the signal strength; or the intelligent robot may also acquire the relative distance between the user and the intelligent robot in a way of Bluetooth distance sensing with other wearable electronic devices, which are not listed here. Those skilled in the art may select a specific way according to actual requirements, which is not limited in the present disclosure.

In the embodiment of the present disclosure, besides acquiring the relative distance between the user and the intelligent robot, the intelligent robot may further detect a relative distance between the user and a preset object, where the preset object may be an object which is set by the user and may cause a security risk, for example, a table corner or a shelf, or may be an object in a current environment which is similar to the table corner or the shelf and is regarded as the preset object by the intelligent robot based on user setting, for example, a cutting tool or a shelf. It is assumed that the preset object is the table corner, when the user walks from the bedroom to the kitchen, the intelligent robot may detect the current position of the user and a position of the table corner by means of infrared distance measurement, to acquire the relative distance between the user and the table corner, for example, 1 m; or the intelligent robot may acquire a relative distance between the user and the intelligent robot itself and a relative distance between the table corner and the intelligent robot itself respectively, and then estimate the relative distance between the user and the table corner, which is not limited in the embodiment of the present disclosure.

After step S101 is performed, step 102 is performed in the method according to the embodiment of the present disclosure, that is, it is determined whether the first parameter meets a preset condition to obtain a first determination result.

In the embodiment of the present disclosure, since the acquired first parameter may be a first distance between the user and the electronic device or a second distance between the user and the first reference object, step S102 may be performed in different ways for different parameters.

First Way

In a case that the first parameter is the first distance, step S102 may be performed as follows.

It is determined whether the first distance is not within a first preset distance range to obtain a first determination result.

During a specific implementing process, the above example is taken again, in a case that the relative distance between the user and the intelligent robot acquired by the intelligent robot by means of infrared distance measurement is 4 m, the intelligent robot compares the acquired relative distance with a preset distance range stored in a storage space of the intelligent robot. The preset distance range may be set by the user, for example, 2 m to 3 m; or the preset distance range may be obtained by analyzing the user's usage condition of the intelligent robot. For example, the intelligent robot finds that the distance between the intelligent robot and the user is within 3 m to 4 m in 80% cases when the user uses the intelligent robot, and thus the preset distance range is 3 m to 4 m by default. It is assumed that the preset distance range is 2 m to 3 m as an example, the intelligent robot determines that 4 m is greater than 3 m, that is, the relative distance between the user and the intelligent robot is greater than a maximum value of the preset range, and thus it is determined that the relative distance between the user and the intelligent robot is not within the preset distance range. If the intelligent robot detects that the relative distance between the user and the intelligent robot is 1 m, 1 m is less than 2 m, that is, the relative distance between the user and the intelligent robot is less than a minimum value of the preset range, and thus it is determined that the relative distance between the user and the intelligent robot is not within the preset distance range.

Second Way

In a case that the first parameter is the second distance, step S102 is implemented as follows.

It is determined whether the second distance is less than or equal to a first preset distance to obtain a first determination result.

During a specific implementing process, the above example is taken again. In a case that the intelligent robot detects that the relative distance between the user and the table corner is 1 m by means of infrared measurement, the intelligent robot compares the acquired relative distance with a preset distance stored in a storage space of the intelligent robot. The preset distance may be set by the user, for example, 2 m; or the preset distance may be obtained by the intelligent robot analyzing data acquired from the network, for example, it is determined through the analysis that danger occurs with a probability of 90% in a case that the distance between the user and the table corner is less than 1 m, and thus the intelligent robot sets 1 m as the preset distance. It is assumed that the preset distance is 2 m set by the user, the intelligent robot determines that 1 m is less than 2 m, and thus it is determined that the second distance is less than or equal to the first preset distance.

Preferably, besides acquiring the relative distance between the user and the table corner, the intelligent robot may also acquire a direction parameter of the user, which may be a motion direction of the user, for example, a motion direction in which the user walks from a bedroom to a kitchen, a direction which the user's face is towards, or other parameters related to the direction of the user, and the direction parameter of the user is not limited in the present disclosure. It is assumed that the direction parameter of the user is the motion direction as an example, the intelligent robot detects that the relative distance between the user and the table corner is 1 m, determines that 1 m is less than 2 m and determines whether the motion direction of the user is a direction close to the table corner. In a case that the motion direction of the user is the direction close to the table corner, the intelligent robot determines that the second distance is less than or equal to the first preset distance.

After step S102 is performed, step S103 is performed in the method according to the embodiment of the present disclosure, that is, the current position is adjusted from the first position to a second position in a case that it is determined that the first parameter meets the preset condition.

In the embodiment of the present disclosure, since the acquired first parameter is the first distance between the user and the electronic device or the second distance between the user and the first reference object, step S103 may be performed in different ways for different parameters.

In a case that the first parameter is the first distance between the user and the electronic device, step S103 may be implemented in the following two ways.

Figure 2:
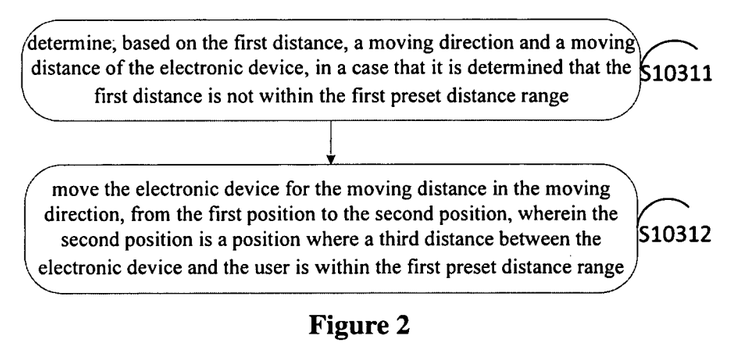
FIG. 2 is a flowchart of a first implementing way of step S103 in a case that a first parameter is a first distance between a user and an electronic device according to the first embodiment of the present disclosure.

A first way is described in conjunction with FIG. 2, which includes step S10311 and step S10312.

In step S10311, a moving direction and a moving distance of the electronic device are determined based on the first distance, in a case that it is determined that the first distance is not within the first preset distance range.

In step S10312, the electronic device is moved for the moving distance in the moving direction, from the first position to the second position. The second position is a position where a third distance between the electronic device and the user is within the first preset distance range.

Figure 3A:
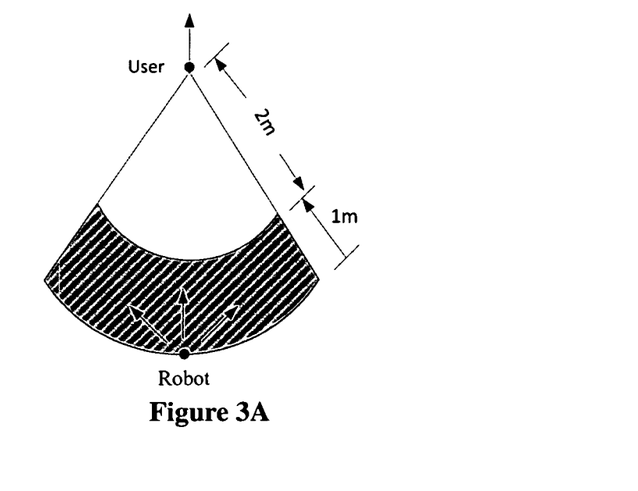
FIG. 3A is a schematic diagram of a first implementation of a second position in step S10312 according to the first embodiment of the present disclosure.
Figure 3B:
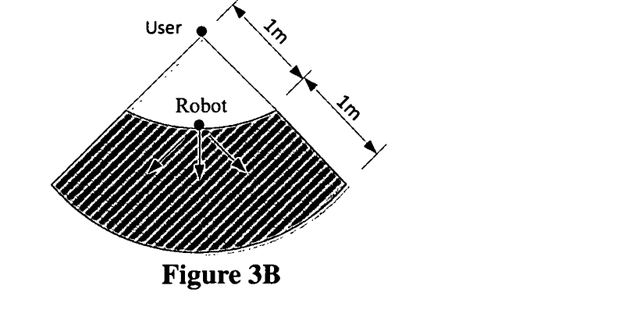
FIG. 3B is a schematic diagram of a second implementation of the second position in step S10312 according to the first embodiment of the present disclosure.

During a specific implementing process, if the preset distance range is 2 m to 3 m and the relative distance between the user and the intelligent robot is 4 m, since 4 m is greater than 3 m, the intelligent robot automatically moves close to the user such that the relative distance between the intelligent robot and the user is within the preset distance range, and the moving distance of the intelligent robot is any value between 1 m and 2 m, for example, 2 m or 1 m. The moving direction of the intelligent robot is any direction within a preset angle range (for example, 30 degrees or 45 degrees) of which a center is the current position of the user and a center line is the motion direction of the user, as shown in FIG. 3A, and the second position is any position in a shaded part of FIG. 3A. If the preset distance range is 2 m to 3 m and the relative distance between the user and the intelligent robot is 1 m, 1 m is less than 2 m, in this case, the intelligent robot automatically moves in a direction away from the user; similarly, the moving distance and the moving direction of the intelligent robot may be determined, as shown in FIG. 3B, and the second position is any position in a shaded part of FIG. 3B.

Therefore, the intelligent robot can adjust its current position in a real-time manner based on the distance between the intelligent robot itself and the user. For example, in a case that the distance between the intelligent robot and the user is greater than a maximum value of the preset distance range, the intelligent robot moves close to the user automatically; in a case that the distance between the intelligent robot and the user is less than a minimum value of the preset distance range, the intelligent root moves away from the user automatically; or in a case that the distance between the intelligent robot and the user is within the preset distance range, the intelligent robot stays where it is, and the relative distance between the intelligent robot and the user remains within the preset distance range, thereby achieving a technical effect that the intelligent robot follows the user automatically.

Figure 4:
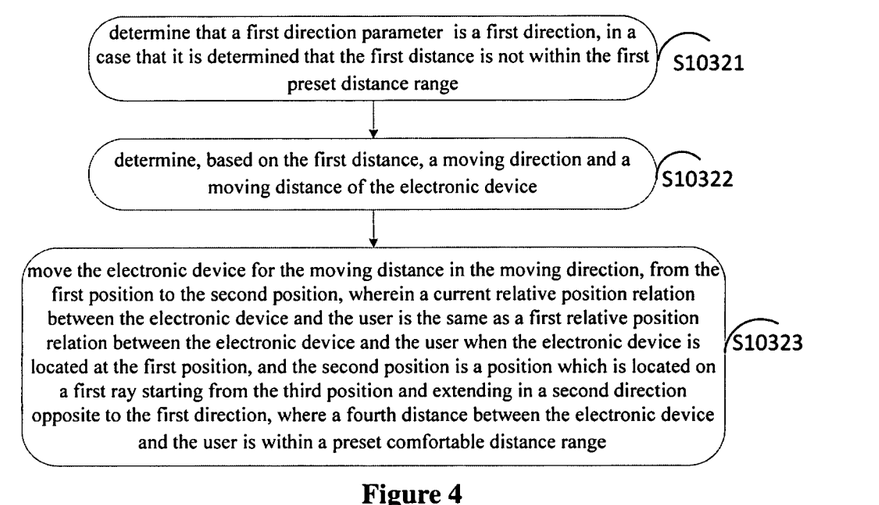
FIG. 4 is a flowchart of a first implementing way of step S103 in a case that the first parameter is the first distance between the user and the electronic device according to the first embodiment of the present disclosure.

A second way is described in conjunction with FIG. 4, which includes step S10321, step S10322 and step S10323.

In step S10321, a first direction parameter is determined to be a first direction in a case that it is determined that the first parameter meets the preset condition.

In step S10322, a moving direction and a moving distance of the electronic device are determined based on the first distance.

In step S10323, the electronic device is moved for the moving distance in the moving direction, from the first position to the second position, such that the current relative position relation between the electronic device and the user is the same as a first relative position relation between the electronic device and the user when the electronic device is located at the first position. The second position is a position which is located on a first ray starting from the third position and extending in a second direction opposite to the first direction, where a fourth distance between the electronic device and the user is within a preset comfortable distance range.

Figure 5A:
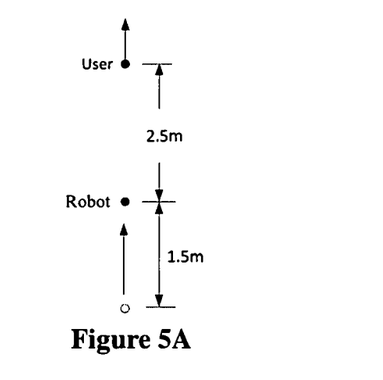
FIG. 5A is a schematic diagram of a first moving way for step S10323 according to the first embodiment of the present disclosure.
Figure 5B:
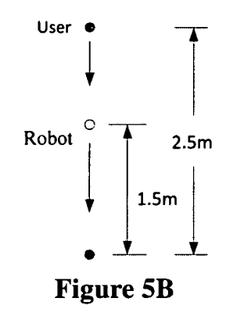
FIG. 5B is a schematic diagram of a second moving way for step S10323 according to the first embodiment of the present disclosure.

During a specific implementing process, it is assumed that the first direction parameter is a motion direction of the user as an example, the intelligent robot determines the motion direction of the user based on a starting position of the user before movement and a current position of the user, for example, a straight ahead direction. If the relative distance between the user and the intelligent robot is 2.5 m before the movement of the user, the preset distance range is 2 m to 3 m, and the relative distance between the user and the intelligent robot is 4 m after the movement of the user, since 4 m is greater than 3 m, the intelligent robot has to move towards the user for 1.5 m in the straight ahead direction to maintain the relative position relation between the user and the intelligent robot, as shown in FIG. 5A. If the relative distance between the user and the intelligent robot is 2.5 m before the movement of the user, the preset distance range is 2 m to 3 m and the relative distance between the user and the intelligent robot is 1 m after the movement of the user, 1 m is less than 2 m, the intelligent robot moves for 1.5 m in a direction away from the user, as shown in FIG. 5B.

Therefore, after the relative position relation between the intelligent robot and the user is determined, the intelligent robot can adjust its current position in a real-time manner based on the distance between the intelligent robot itself and the user and the direction parameter of the user. For example, in a case that the user moves for 1 m in a straight ahead direction, the intelligent robot also moves for 1 m in the straight ahead direction; in a case that the user moves for 1 m in a right behind direction, the intelligent robot also moves for 1 m in the right behind direction; or in a case that the user stands where it is and rotates for 30 degrees in a clockwise direction, the intelligent robot also rotates for 30 degrees in the clockwise direction, thereby maintaining the relative position relation between the intelligent robot and the user all the time and achieving a better technical effect that the intelligent robot follows the user automatically.

Figure 6:
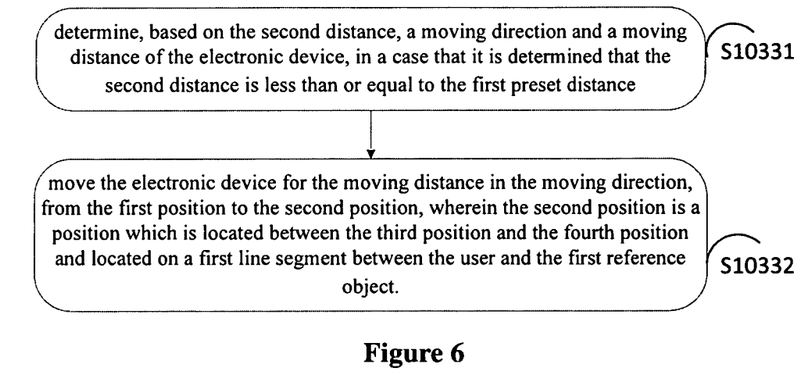
FIG. 6 is a flowchart of an implementing way of step S103 in a case that the first parameter is a second distance between the user and the first reference object according to the first embodiment of the present disclosure.

In a case that the first parameter is a second distance between the user and the first reference object, step S103 may be implemented as follows, referring to FIG. 6.

In step S10331, a moving direction and a moving distance of the electronic device are determined based on the second distance in a case that it is determined that the second distance is less than or equal to the first preset distance.

In step S10332, the electronic device is moved for the moving distance in the moving direction, from the first position to the second position. The second position is a position which is located between the third position and the fourth position and located on a first line segment between the user and the first reference object.

During a specific implementing process, if the first preset distance is 2 m and a relative distance between the user and a table corner is 1 m, since 1 m is less than 2 m, the intelligent robot automatically moves to a position between the user and the table corner to prevent the user from closing to the table corner. In this case, the intelligent robot may be located at any position between the user and the table corner. For example, the intelligent robot may be located at a position relatively closer to the user, such as a position which is 0.4 m from the user; may also be located at a position relatively closer to the table corner, such as a position which is 0.8 m from the user; or may also be located at a middle position between the user and the table corner, such as a position which is 0.5 m from the user.

Therefore, in a case that the intelligent robot detects that the distance between the user and the preset object is less than the preset distance, the intelligent robot does not follow the user and moves to a position between the user and the preset object to prevent the user from closing to the preset object; a technical effect that the safety of the user is protected is achieved, in a case that the preset object is a dangerous object.

Second Embodiment

Figure 7:
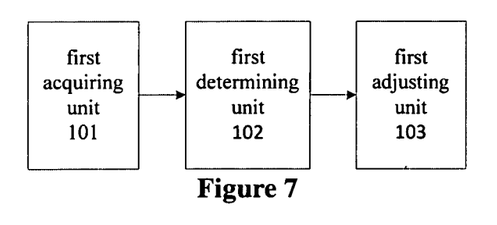
FIG. 7 is a structural block diagram of an electronic device according to a second embodiment of the present disclosure.

An electronic device is provided according to a second embodiment of the present disclosure. Referring to FIG. 7, the electronic device includes a first acquiring unit 101, a first determining unit 102 and a first adjusting unit 103.

The first acquiring unit 101 is configured to acquire a first parameter related to a first behavior of a user of the electronic device in a case that a current position of the electronic device is a first position. The first behavior is a behavior which does not cause the electronic device to move.

The first determining unit 102 is configured to determine whether the first parameter meets a preset condition to obtain a first determination result.

The first adjusting unit 103 is configured to adjust the current position from the first position to a second position, in a case that it is determined that the first parameter meets the preset condition.

In the second embodiment of the present disclosure, the first acquiring unit 101 may include a first acquiring module or a second acquiring module.

The first acquiring module is configured to acquire a first distance between the user and the electronic device based on first user information on the user.

The second acquiring module is configured to acquire a second distance between the user and a first reference object based on the first user information and a fourth position where the first reference object is located. The first reference object is an object preset by the user.

In the second embodiment of the present disclosure, in a case that the first parameter is the first distance, the first determining unit 102 may be a first determining module configured to determine whether the first distance is not within a first preset distance range to obtain a first determination result.

In the second embodiment of the present disclosure, in a case that the first parameter is the second distance, the first determining unit 102 may include:

a second determining module configured to determine whether the second distance is less than or equal to a first preset distance to obtain a first determination sub-result;

a third acquiring module configured to acquire a first direction parameter of the user in a case that it is determined that the second distance is less than or equal to the first preset distance; and a third determining module configured to determine whether the first direction parameter is a direction in which the user moves close to the first reference object to obtain a first determination result.

In the second embodiment of the present disclosure, the first adjusting unit 103 may include a first determining module and a first adjusting module.

The first determining module is configured to determine a moving direction and a moving distance of the electronic device based on the first distance, in a case that it is determined that the first distance is not within the first preset distance range.

The first adjusting module is configured to control the electronic device to move for the moving distance in the moving direction, from the first position to the second position. The second position is a position where a third distance between the electronic device and the user is within the first preset distance range.

In the second embodiment of the present disclosure, the first adjusting unit 103 may include a second determining module, a third determining module and a second adjusting module.

The second determining module is configured to determine that a first direction parameter is a first direction, in a case that it is determined that the first distance is not within the first preset distance range.

The third determining module is configured to determine a moving direction and a moving distance of the electronic device based on the first distance.

The second adjusting module is configured to control the electronic device to move for the moving distance in the moving direction, from the first position to the second position, such that a current relative position relation between the electronic device and the user is the same as a first relative position relation between the electronic device and the user when the electronic device is located at the first position. The second position is a position which is located on a first ray starting from the third position and extending in a second direction opposite to the first direction, where a fourth distance between the electronic device and the user is within a preset comfortable distance range.

In the second embodiment of the present disclosure, the first adjusting unit 103 may include a fourth determining module and a third adjusting module.

The fourth determining module is configured to determine a moving direction and a moving distance of the electronic device based on the second distance, in a case that it is determined that the second distance is less than or equal to the first preset distance.

The third adjusting module is configured to control the electronic device to move for the moving distance in the moving direction, from the first position to the second position. The second position is a position which is located between the third position and the fourth position and located on a first line segment between the user and the first reference object.

Third Embodiment

Figure 8:
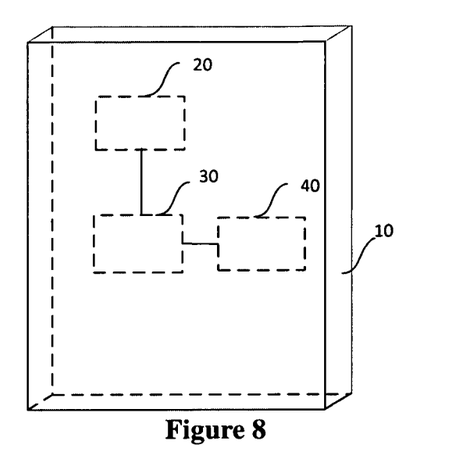
FIG. 8 is a schematic structural diagram of an electronic device according to a third embodiment of the present disclosure.

An electronic device is provided according to a third embodiment of the disclosure. Referring to FIG. 8, the electronic device includes a housing 10, a sensor 20, a processor 30 and a driving unit 40.

The sensor 20 is arranged within the housing 10 and configured to acquire a first parameter related to a first behavior of a user of the electronic device in a case that a current position of the electronic device is a first position. The first behavior is a behavior which does not cause the electronic device to move.

The processor 30 is arranged within the housing 10, connected to the sensor 20 and configured to determine whether the first parameter meets a preset condition to obtain a first determination result.

The driving unit 40 is arranged within the housing 10 and connected to the processor 30. The processor 30 is configured to control the driving unit 40 to drive the electronic device to move from the first position to a second position, in a case that it is determined that the first parameter meets the preset condition.

During a specific implementing process, the housing 10 is mainly used to protect a body of the electronic device and may be made of a material with good crash resistance and dirt resistance, for example, alloys or plastics. The housing 10 may cover a main body of the electronic device.

Figure 9:
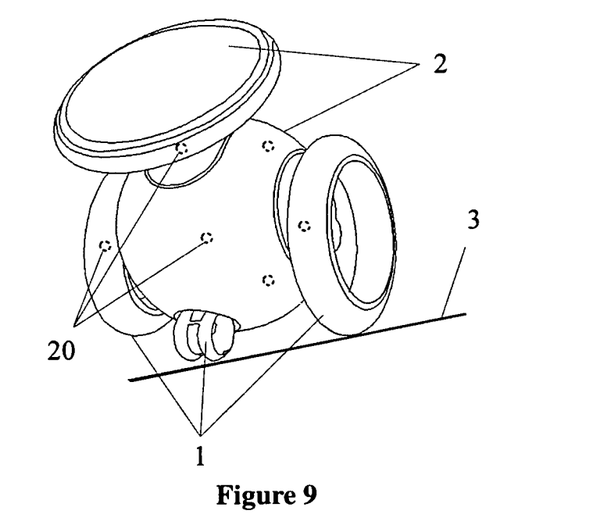
FIG. 9 is a front schematic diagram of the electronic device in a case that the electronic device is a domestic robot according to the third embodiment of the present disclosure.

In the third embodiment of the present disclosure, the electronic device may be a domestic robot. FIG. 9 shows a front schematic diagram of the domestic robot. In FIG. 9, a number 1 represents a wheel assembly of the robot which is the driving unit 40 of the electronic device, a number 2 represents a body of the robot, and a number 3 represents a supporting surface, such as a ground. The body may include a processor 30, and several sensors 20 may be installed on the body to acquire the first parameter related to the first behavior of the user.

In the third embodiment of the present disclosure, the sensor 20 may be configured to:

acquire, based on first user information on the user, a first distance between the user and the electronic device; or acquire, based on the first user information and a fourth position where a first reference object is located, a second distance between the user and the first reference object, where the first reference object is an object preset by the user.

In the third embodiment of the present disclosure, the sensor 20 may include a communication component.

The communication component is connected to the processor and configured to locate and communicate with a wearable electronic device worn on a body of the user to acquire first location information.

During a specific implementing process, the communication component may be a Bluetooth module or an infrared module or the like, which receives a Bluetooth signal or an infrared signal transmitted from the wearable electronic device of the user to acquire current position information of the user; or may be other communication modules, which is not limited in the embodiments of the present disclosure.

In the third embodiment of the present disclosure, in a case that the first parameter is the first distance, the processor 30 may be configured to:

determine whether the first distance is not within a first preset distance range to obtain a first determination result.

In the third embodiment of the present disclosure, in a case that the first parameter is the second distance, the processor 30 may be configured to:

determine whether the second distance is less than or equal to a first preset distance to obtain a first determination result.

In the third embodiment of the present disclosure, the processor 30 may be configured to:

determine, based on the first distance, a moving direction and a moving distance of the electronic device, in a case that it is determined that the first distance is not within the first preset distance range; and control the driving unit 40 to drive the electronic device to move for the moving distance in the moving direction, from the first position to the second position, where the second position is a position where a third distance between the electronic device and the user is within the first preset distance range.

In the third embodiment of the present disclosure, the processor 30 may be configured to:

determine that a first direction parameter is a first direction, in a case that it is determined that the first distance is not within the first preset distance range;

determine, based on the first distance, a moving direction and a moving distance of the electronic device; and control the driving unit 40 to drive the electronic device to move for the moving distance in the moving direction, from the first position to the second position, where a current relative position relation between the electronic device and the user is the same as a first relative position relation between the electronic device and the user when the electronic device is located at the first position, and the second position is a position which is located on a first ray starting from the third position and extending in a second direction opposite to the first direction, where a fourth distance between the electronic device and the user is within a preset comfortable distance range.

In the third embodiment of the present disclosure, the processor 30 may be configured to:

determine, based on the second distance, a moving direction and a moving distance of the electronic device, in a case that it is determined that the second distance is less than or equal to the first preset distance; and control the driving unit 40 to drive the electronic device to move for the moving distance in the moving direction, from the first position to the second position where the second position is a position which is located between the third position and the fourth position and located on a first line segment between the user and the first reference object.

With one or more technical solutions in the embodiments of the present disclosure, one or more of the following technical effects can be achieved.

Firstly, according to the technical solutions in the embodiments of the present disclosure, a first parameter related to a first behavior of a user of an electronic device is acquired in a case that a current position of the electronic device is a first position, where the first behavior is a behavior which does not cause the electronic device to move; it is determined whether the first parameter meets a preset condition to obtain a first determination result; and the current position is adjusted from the first position to a second position in a case that it is determined that the first parameter meets the preset condition. In this way, the electronic device can detect a parameter related to the user automatically and make a determination based on the parameter; in a case that the parameter meets a moving condition of the electronic device, the electronic device can adjust its current position automatically based on the current parameter, thereby efficiently solving a technical issue that the conventional electronic device can not adjust the current position until a control instruction from the user or a remote controller is received, and achieving a technical effect that the electronic device adjusts its current position automatically based on the behavior of the user.

Secondly, according to the technical solutions in the embodiments of the present disclosure, a first distance between the user and the electronic device is acquired; it is determined whether the first distance is not within a first preset distance range to obtain a first determination result; a moving direction and a moving distance of the electronic device is determined based on the first distance, in a case that it is determined that the first distance is not within the first preset distance range; the electronic device is moved for the moving distance in the moving direction, from the first position to the second position, such that a current relative position relation between the electronic device and the user is the same as a first relative position relation between the electronic device and the user when the electronic device is located at the first position. In this way, the electronic device can adjust its current position in a real-time manner based on the distance between the intelligent robot itself and the user, such that the relative position relation between the electronic device and the user is maintained, thereby achieving a technical effect that the electronic device follows the user automatically.

Thirdly, according to the technical solutions in the embodiments of the present disclosure, a second distance between the user and the first reference object is acquired, where the first reference object is an object preset by the user; it is determined whether the second distance is less than or equal to a first preset distance to obtain a first determination sub-result; a first direction parameter of the user is acquired in a case that it is determined that the second distance is less than or equal to the first preset distance; it is determined whether the first direction parameter is a direction in which the user moves close to the first reference object to obtain a first determination result; a moving direction and a moving distance of the electronic device are determined based on the second distance, in a case that it is determined that the second distance is less than or equal to the first preset distance; the electronic device is moved for the moving distance in the moving direction, from the first position to the second position, where the second position is a position which is located between the third position and the fourth position and located on a first line segment between the user and the first reference object. In this way, in a case that it is detected that the distance between the user and the preset object is less than the preset distance, the electronic device can automatically move to a position between the user and the preset object to prevent the user from closing to the preset object; and a technical effect that the safety of the user is protected is achieved in a case that the preset object is a dangerous object.

Fourthly, according to the technical solutions in the embodiments of the present disclosure, a first parameter related to a first behavior of a user the electronic device is acquired in a case that a current position of the electronic device is a first position, where the first behavior is a behavior which does not cause the electronic device to move; it is determined whether the first parameter meets a preset condition to obtain a first determination result; and the current position is adjusted from the first position to a second position, in a case that it is determined that the first parameter meets the preset condition. In this way, the electronic device can make a feedback automatically based on the behavior of the user without a control instruction from the user, and thereby solving a technical issue that the conventional electronic device has complicated operations and low efficiency in interaction with the user, and achieving a technical effect that operational steps are simplified and operational efficiency is improved.

It is to be understood by those skilled in the art that the embodiments of the present disclosure may be implemented as a method, a system or a computer program product. Hence, the present disclosure may be embodied as only hardware embodiments, only software embodiments or embodiments of a combination of software and hardware. In addition, the present disclosure may be embodied as a computer program product implemented on one or more computer available storage media (including but not limited to a magnetic disk memory, CD-ROM and an optical memory) containing computer available program codes.

The present disclosure is described by referring to flowcharts and/or block diagrams of methods, devices (systems) and computer program products according to the embodiments of the present disclosure. It should be understood that each flow and/or block in the flowcharts and/or block diagrams and a combination of flows and/or blocks in the flowcharts and/or block diagrams may be implemented by computer program instructions. Theses computer program instructions may be provided to a general-purpose computer, a dedicated computer, an embedded processor or processors of other programmable data processing devices to generate machine language, such that the instructions executed by the computer or the processors of other programmable data processing devices generate a device for achieving functions specified in one or more flow in the flowcharts and/or one or more block in the block diagrams.

These computer program instructions may also be stored in a computer readable memory which can guide the computer or other programmable data processing devices to operate in a specific mode, such that the instructions stored in the computer readable memory generate a product including an instruction device, and the instruction device achieves functions specified in one or more flow in the flowcharts and/or one or more blocks in the block diagrams.

These computer program instructions may also be loaded to the computer or other programmable data processing devices, such that a series of operation steps are performed on the computer or other programmable devices to generate processing implemented by the computer, hence, the instructions executed on the computer or other programmable devices perform steps for achieving functions specified in one or more flow in the flowcharts and/or one or more block in the block diagrams.

Specifically, the computer program instructions corresponding to the information processing method according to the embodiments of the present disclosure may be stored in storage media such as an optical disk, a hard disk or a USB flash disk or the like. The computer program instructions in the storage media which correspond to the information processing method, when being read or executed by an electronic device, includes:

acquiring a first parameter related to a first behavior of a user of an electronic device, in a case that a current position of the electronic device is a first position, where the first behavior is a behavior which does not cause the electronic device to move;

determining whether the first parameter meets a preset condition to obtain a first determination result; and adjusting the current position from the first position to a second position in a case that it is determined that the first parameter meets the present condition.

Optionally, computer program instructions stored in the storage media which correspond to the process of acquiring a first parameter related to a first behavior of a user of an electronic device, when being executed, includes:

acquiring, based on first user information on the user, a first distance between the user and the electronic device; or acquiring, based on the first user information and a fourth position where a first reference object is located, a second distance between the user and the first reference object, where the first reference object is an object preset by the user.

Optionally, in a case that the first parameter is the first distance, computer program instructions stored in the storage media which correspond to the process of determining whether the first parameter meets a preset condition to obtain a first determination result, when being executed, includes:

determining whether the first distance is not within a first preset distance range to obtain a first determination result.

Optionally, in a case that the first parameter is the second distance, computer program instructions stored in the storage media which correspond to the process of determining whether the first parameter meets a preset condition to obtain a first determination result, when being executed, includes:

determining whether the second distance is less than or equal to a first preset distance to obtain a first determination sub-result;

acquiring a first direction parameter of the user in a case that it is determined that the second distance is less than or equal to the first preset distance; and determining whether the first direction parameter is a direction in which the user moves close to the first reference object to obtain a first determination result.

Optionally, computer program instructions stored in the storage media which correspond to the process of adjusting the current position from the first position to a second position, when being executed, includes:

determining, based on the first distance, a moving direction and a moving distance of the electronic device, in a case that it is determined the first distance is not within the first preset distance range; and controlling the electronic device to move for the moving distance in the moving direction, from the first position to the second position, where the second position is a position where a third distance between the electronic device and the user is within the first preset distance range.

Optionally, computer program instructions stored in the storage media which correspond to the process of adjusting the current position from the first position to a second position, when being executed, includes:

determining that a first direction parameter is a first direction, in a case that it is determined that the first direction parameter is the direction in which the user moves close to the first reference object;

determining, based on the first distance, a moving direction and a moving distance of the electronic device; and controlling the electronic device to move for the moving distance in the moving direction, from the first position to the second position, where a current relative position relation between the electronic device and the user is the same as a first relative position relation between the electronic device and the user when the electronic device is located at the first position, and the second position is a position which is located on a first ray starting from the third position and extending in a second direction opposite to the first direction, where a fourth distance between the electronic device and the user is within a preset comfortable distance range.

Optionally, computer program instructions stored in the storage media which correspond to the process of adjusting the current position from the first position to a second position, when being executed, includes:

determining, based on the second distance, a moving direction and a moving distance of the electronic device, in a case that it is determined that the first direction parameter is the direction in which the user moves close to the first reference object; and controlling the electronic device to move for the moving distance in the moving direction, from the first position to the second position, where the second position is a position which is located between the third position and the fourth position and located on a first line segment between the user and the first reference object.

Although preferred embodiments of the present disclosure have been described, those skilled in the art can make additional alternations and changes to these embodiments once they know the basic inventive concepts. Hence, the appended claims are intended to include the preferred embodiments and all the alterations and changes falling within the scope of the present disclosure.

Apparently, those skilled in the art can make various changes and variations without departing from the spirit and range of the present disclosure. In this way, the present disclosure is intended to include the changes and variations of the present disclosure which fall within the scope of the claims of the present disclosure and the equivalent technology thereof.

The invention claimed is:

1. An information processing method, comprising:
acquiring, by a sensor of an electronic device, a first parameter related to a first behavior of a user of the electronic device, in a case that a current position of the electronic device is a first position, wherein the first behavior is a behavior which does not cause the electronic device to move;
determining, by a processor of the electronic device, whether the first parameter meets a preset condition to obtain a first determination result, wherein (i) the preset condition is related to a first distance and (ii) the first distance is a distance between the electronic device and the user; and
adjusting, by a driving unit of the electronic device, the current position from the first position to a second position, in a case that it is determined that the first parameter meets the preset condition,
wherein:
the acquiring, by the sensor of the electronic device, the first parameter includes acquiring, based on a first user information and a fourth position, a second distance between the user and a first reference object, the first reference object is located at the fourth position, and
the first reference object is an object preset by the user.

2. The method according to claim 1, wherein the first user information on the user comprises a third position where the user is located or first location information obtained by locating the electronic device and a wearable electronic device worn on a body of the user.

3. The method according to claim 1, wherein in a case that the first parameter is the first distance, the determining whether the first parameter meets a preset condition to obtain a first determination result comprises:
determining whether the first distance is not within a first preset distance range to obtain a first determination result.

4. The method according to claim 1, wherein in a case that the first parameter is the second distance, the determining whether the first parameter meets a preset condition to obtain a first determination result comprises:
determining whether the second distance is less than or equal to a first preset distance to obtain a first determination result.

5. The method according to claim 4, wherein the determining whether the second distance is less than or equal to a first preset distance to obtain a first determination result comprises:

determining whether the second distance is less than or equal to a first preset distance to obtain a first determination sub-result;

acquiring a first direction parameter of the user in a case that it is determined that the second distance is less than or equal to the first preset distance; and determining whether the first direction parameter is a direction in which the user moves close to the first reference object to obtain a first determination result.

6. The method according to claim 3, wherein the adjusting the current position from the first position to a second position comprises:

determining, based on the first distance, a moving direction and a moving distance of the electronic device, in a case that it is determined that the first distance is not within the first preset distance range; and controlling the electronic device to move for the moving distance in the moving direction, from the first position to the second position, wherein the second position is a position where a third distance between the electronic device and the user is within the first preset distance range.

7. The method according to claim 3, wherein the adjusting the current position from the first position to a second position comprises:

determining that a first direction parameter is a first direction, in a case that it is determined that the first distance is not within the first preset distance range;

determining, based on the first distance, a moving direction and a moving distance of the electronic device; and controlling the electronic device to move for the moving distance in the moving direction, from the first position to the second position, wherein a current relative position relation between the electronic device and the user is the same as a first relative position relation between the electronic device and the user when the electronic device is located at the first position, and the second position is a position which is located on a first ray starting from a third position and extending in a second direction opposite to the first direction, where a fourth distance between the electronic device and the user is within a preset comfortable distance range.

8. The method according to claim 4, wherein the adjusting the current position from the first position to a second position comprises:

determining, based on the second distance, a moving direction and a moving distance of the electronic device, in a case that it is determined that the second distance is less than or equal to the first preset distance; and controlling the electronic device to move for the moving distance in the moving direction, from the first position to the second position, wherein the second position is a position which is located between a third position and the fourth position and located on a first line segment between the user and the first reference object.

9. An electronic device, comprising:

a first acquiring unit configured to acquire a first parameter related to a first behavior of a user of the electronic device in a case that a current position of the electronic device is a first position, wherein the first behavior is a behavior which does not cause the electronic device to move;

a first determining unit configured to determine whether the first parameter meets a preset condition to obtain a first determination result, wherein (i) the preset condition is related to a first distance and (ii) the first distance is a distance between the electronic device and the user; and a first adjusting unit configured to adjust the current position from the first position to a second position in a case that it is determined that the first parameter meets the preset condition, wherein:
the first acquiring unit is configured to acquire a second distance between the user and a first reference object based on a first user information and a fourth position, a first reference object is located at the fourth position, and the first reference object is an object preset by the user.

10. An electronic device, comprising:

a housing;

a sensor arranged within the housing and configured to acquire a first parameter related to a first behavior of a user of the electronic device in a case that a current position of the electronic device is a first position, wherein the first behavior is a behavior which does not cause the electronic device to move;

a processor arranged within the housing, connected to the sensor and configured to determine whether the first parameter meets a preset condition to obtain a first determination result, wherein (i) the preset condition is related to a first distance and (ii) the first distance is a distance between the electronic device and the user; and a driving unit arranged within the housing and connected to the processor, wherein the processor is configured to control the driving unit to drive the electronic device to move from the first position to a second position, in a case that it is determined that the first parameter meets the preset condition, wherein:
the sensor is configured to acquire, based on a first user information and a fourth position, a second distance between the user and a first reference object, the first reference object is located at the fourth position, and the first reference object is an object preset by the user.

11. The electronic device according to claim 10, wherein the sensor comprises:

a communication component connected to the processor and configured to locate and communicate with a wearable electronic device worn on a body of the user to obtain first location information.

12. The electronic device according to claim 10, wherein the processor is configured to, when the first parameter is the first distance, determine whether the first distance is not within a first preset distance range to obtain a first determination result.

13. The electronic device according to claim 10, wherein in a case that the first parameter is the second distance, the processor is configured to:

determine whether the second distance is less than or equal to a first preset distance to obtain a first determination result.

14. The electronic device according to claim 12, wherein the processor is configured to:

determine, based on the first distance, a moving direction and a moving distance of the electronic device, in a case that it is determined that the first distance is not within the first preset distance range; and control the driving unit to drive the electronic device to move for the moving distance in the moving direction, from the first position to the second position, wherein the second position is a position where a third distance between the electronic device and the user is within the first preset distance range.

15. The electronic device according to claim 12, wherein the processor is configured to:
  determine that a first direction parameter is a first direction, in a case that it is determined that the first distance is not within the first preset distance range;
  determine, based on the first distance, a moving direction and a moving distance of the electronic device; and
  control the driving unit to drive the electronic device to move for the moving distance in the moving direction, from the first position to the second position, wherein a current relative position relation between the electronic device and the user is the same as a first relative position relation between the electronic device and the user when the electronic device is located at the first position, and the second position is a position which is located on a first ray starting from a third position and extending in a second direction opposite to the first direction, where a fourth distance between the electronic device and the user is within a preset comfortable distance range.

16. The electronic device according to claim 13, wherein the processor is configured to:
  determine, based on the second distance, a moving direction and a moving distance of the electronic device, in a case that it is determined that the second distance is less than or equal to the first preset distance; and
  control the driving unit to drive the electronic device to move for the moving distance in the moving direction, from the first position to the second position, wherein the second position is a position which is located between a third position and the fourth position and located on a first line segment between the user and the first reference object.

* * * * *